W. M. AUSTIN.
FLUID PRESSURE AIR BRAKE.
APPLICATION FILED MAY 18, 1904.

915,724.

Patented Mar. 23, 1909.
5 SHEETS—SHEET 1.

UNITED STATES PATENT OFFICE.

WALTER MERVILLE AUSTIN, OF SWISSVALE, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE AIR-BRAKE.

No. 915,724.　　　　Specification of Letters Patent.　　Patented March 23, 1909.

Application filed May 18, 1904. Serial No. 208,496.

*To all whom it may concern:*

Be it known that I, WALTER M. AUSTIN, a citizen of the United States, residing at Swissvale, in the county of Allegheny and State of Pennsylvania, have invented certain new and useful Improvements in Fluid-Pressure Air-Brakes, of which the following is a full, clear, and exact description.

This invention relates to fluid pressure train brakes, the objects being to devise a system of brakes such that the engineer can have perfect control of the brakes at all times. He may make a graduated application of the brakes or an emergency application, and he may release the brakes at will, the same as in the systems now in use. He can also make a graduated or partial release of the brakes, and when once the brakes have been applied, the engineer may be sure that every brake cylinder in the train will have the same pressure maintained therein until the pressure is increased or diminished by a new movement of the brake handle, irrespective of any leakage that may occur in any part of the system. I also provide for a practically instantaneous application of the brakes in case of emergency, and in cases where the train is operated at high speeds the emergency application furnishes a much higher pressure in the brake cylinder than for ordinary speeds, which pressure is automatically reduced as the train decreases in speed and comes to rest. By my improved system I can keep the product of brake cylinder pressure and the coefficient of friction between brake shoes and wheels approximately at a constant.

In accomplishing the objects of my invention, I use a triple valve in some respects similar to the one described in my patent application filed Oct. 24, 1903, Serial No. 178,339 and an engineer's valve similar in some respects to the engineer's valve described in my patent application filed Oct. 29, 1903, Serial No. 179,043.

One feature of my improvements resides in the use of puppet valves in my triple valve, whereby I am able to materially reduce the travel of the diaphragms and thus avoid the undue strain on the diaphragms experienced when slide valves are used. In order to save space in the engineer's cab, I have separated the feed valve and discharge valve from the manually operated portion of the engineer's valve and placed them outside the cab. The engineer's valve is so designed that by turning an auxiliary cock we can change the pressure maintained in the train pipe by the feed valve from a low pressure to a high pressure, or vice versa. If the train is to be run at a low speed, the lower pressure is used, but if the speed is to be high, the higher pressure is used. In order to prevent sliding of the wheels, as the train decreases in speed and comes to rest, on account of the increase in the coefficient of friction between brake shoes and wheels, I use a high speed release valve to control the feed valve to admit pressure from main reservoir to train-pipe and thus partially release the brakes after an emergency application at high speed. The high speed release valve has a centrifugal governor geared to some moving part of the train, preferably to an axle on the locomotive. This governor, after an emergency application, regulates the train-pipe pressure according to the speed of the train at every instant, while a spring automatically closes the direct exhaust port of the engineer's valve. In effecting an instantaneous rise in brake cylinder pressure to its full value in emergency applications, I use an automatic valve so designed that when train pipe pressure has about ceased to flow into the brake cylinder, a large port is opened between the auxiliary reservoir and brake cylinder.

My invention will be described in detail with reference to the accompanying drawings, in which.

In the following description stress will be laid only upon such parts of the construction as concern the present invention, it being understood that numerous features found in ordinary fluid pressure brakes are used in conjunction with the novel devices.

Figure 1:
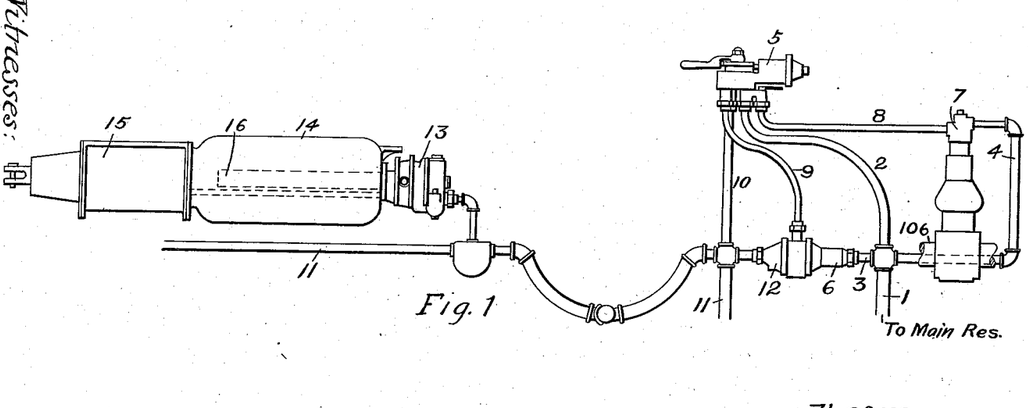
Figure 1 is a diagrammatic arrangement of the parts of a fluid pressure brake system embodying my invention.

Referring to the drawings, 1 is a pipe leading from the main reservoir or other source of fluid pressure. Connection is made through 2 with the supply port of the engineer's valve 5 and through 3 with the equalizing feed valve 6 and through 4 with the high speed releasing valve 7. Pipe 8 connects the high speed releasing valve 7 with the engineer's valve 5. Pipe 9 connects the common equalizing chamber of the equalizing feed valve and the equalizing discharge valve with the train-pipe regulator of the engineer's valve. Pipe 10 is a branch from train-pipe 11 to engineer's valve.

12 is the equalizing discharge valve, 13 is the triple valve connected to a branch of the train-pipe 11, and to the auxiliary reservoir 14 and brake cylinder 15 in the usual manner, and also connected to the supplemental or pressure reservoir 16. The levers, rods, beams and shoes connect to the brake cylinder in any approved manner.

Figure 2:
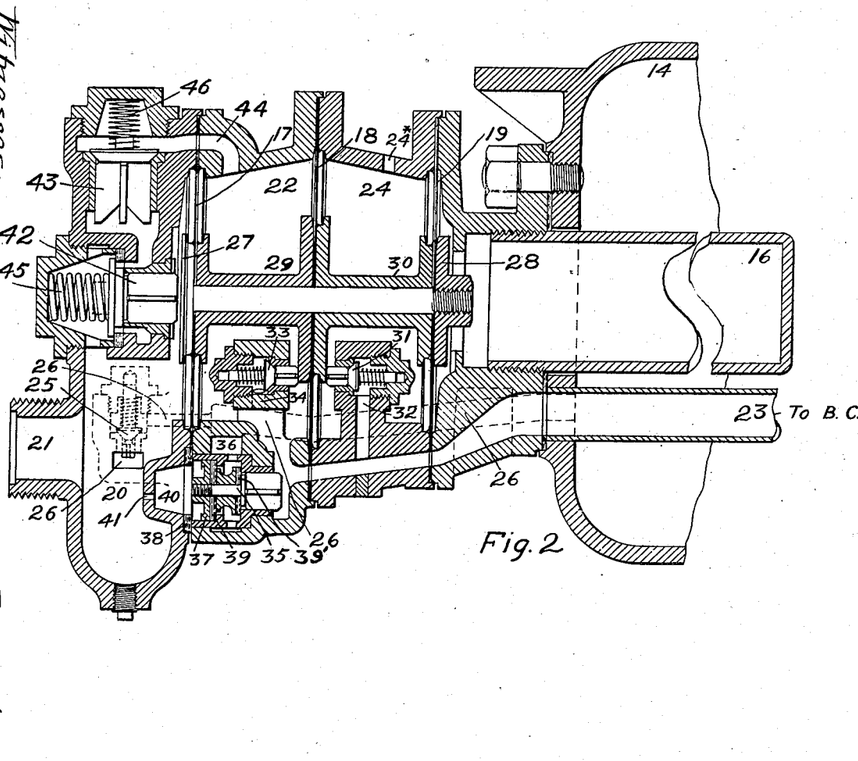
Fig. 2 is a longitudinal section of my improved triple valve with parts of the auxiliary reservoir, the supplemental reservoir and the pipe leading to the brake cylinder.

My triple valve is contained in a case having four sections; between these sections are clamped the outer edges of the three diaphragms 17, 18 and 19. The space 20 to the left of the diaphragm 17 is in communication with train-pipe 11 which is connected to the triple valve at 21. The space 22 between diaphragms 17 and 18 connects with brake cylinder 15 through passage 23. The space 24 between diaphragms 18 and 19 is open to atmosphere through a port 24*. The space to the right of diaphragm 19 is in direct communication with supplemental reservoir 16 which projects into the auxiliary reservoir 14. Check valve 25 normally closes a passage 26 leading from space 20 to auxiliary reservoir 14. In the cut away portion a check valve similar to 25 normally closes a passage leading from space 20 to supplemental reservoir 16. The middle of diaphragms 17, 18 and 19 are clamped between disks 27 and 28 and separators 29 and 30. Puppet valve 31 normally closes passage 32 between space 24 and passage 23. Puppet valve 33 normally closes passage 34 between space 22 and passage 26. Valve 35 normally closes passage 36 also between space 22 and passage 26. The valve is formed with a pair of valve surfaces 39 and 39' adapted to engage separate valve seats in such a way that the surface 39 is held against its seat by the train pipe pressure, while the surface 39' is constrained away from its seat by the pressure in the brake cylinder. The ports 36 into the auxiliary reservoir are located at an intermediate point of the valve, so that the pressure of the auxiliary reservoir is balanced on the two end surfaces of the valve. In practice it is not quite balanced, there being a slight excess pressure on the surface 39. By reason of this construction, when the brake cylinder pressure becomes equal to that of the train pipe, the valve 35 is thrown to the left until its surface 39 contacts with the sealing leather 38. This opens the intermediate ports 36 leading to the auxiliary reservoir directly into the brake cylinder. Space 40 to the left of piston 37 is open to space 20 through port 41.

The emergency valve 42 and the emergency check valve 43 are the same as those shown in my patent application of Oct. 24, 1903, previously referred to.

Figure 9:
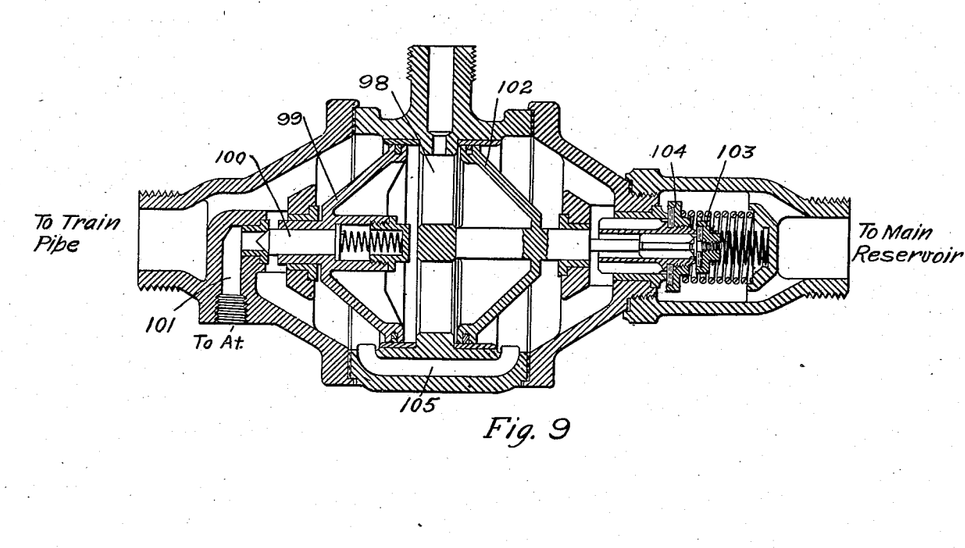
Fig. 9 is a longitudinal section of the combined equalizing feed valve and equalizing discharge valve.
Figure 14:
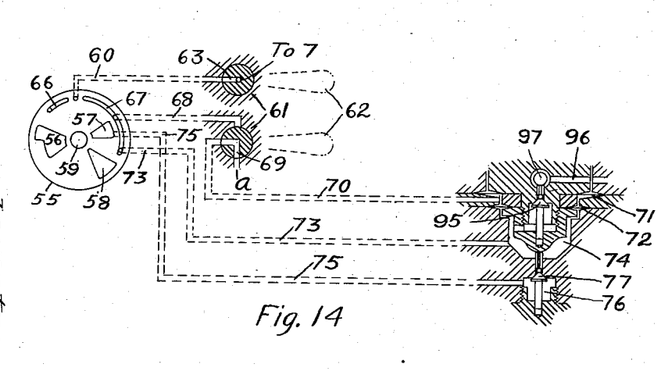
Fig. 14 is a diagram of the passages connecting rotary valve with train pipe regulator.

The engineer's valve consists of a rotary valve 47 and a pressure regulator 48. 48 automatically controls the pressure in the equalizing chamber 98 (Fig. 9). The rotary valve has two large ports or cavities 49 and 50 connected by a passage 51 and two small ports 52 and 53 connected by a passage 54. Rotary valve 47 rests on valve seat 55. 55 is provided with port 56 leading to the train pipe, port 57 leading to the main reservoir through pipe 2, port 58 leading to the atmosphere at 58*, port 59 leading to the equalizing chamber 98, through pipe 9, port 60 leading to cock 61, and when handle 62 of cock 61 is in position shown in Fig. 3, which is the position for high speed, port 60 leads through port 63 in cock key 64, thence through port 65 to pipe 8 leading to high speed release valve 7. When handle 62 is moved so that it is pointing outward from the plane of the drawing, Fig. 3, all communication between port 60 and high speed release valve 7 is cut off. Rotary valve seat also has a groove 66 communicating with port 56 and thence with train pipe, and a groove 67 connected by port 68 with cock 61. When cock handle is in position shown in Fig. 3, port 68 is cut off, but passage 70 is connected with port 69 and space between diaphragms 71 and 72 is open to atmosphere through port $a$, but when handle 62 is turned so that it points outward from the plane of the drawing, port 68 communicates through port 69 in cock key 64 with passage 70 and space between diaphragms 71 and 72 of the pressure regulator. Groove 67 also connects by passage 73 (in the cut away portion of Fig. 3) see Fig. 14, with space 74 to the right hand of diaphragm 72. Passage 75 connects from main reservoir through port 57 to space 76 to the right hand of valve 77. Rotary valve 47 is turned by handle 78 through valve stem 79. Surrounding 79 and turning with it is a cam 80. Inside cam 80 is a spring 81 fastened to the cam at one end and having a hook at the free end adapted to engage a projection 82 on a non-movable part of the apparatus when handle 78 has been turned to high speed release position and to distort spring 81 while handle is moving from high speed release to emergency position. Spring 81 will return rotary valve 47 and handle 78 from emergency position to high speed releasing position, when the manual pressure is removed from handle 78. The sliding spring abutment 83 presses against cam 80. A movement of brake handle from running position toward full equalized pressure position, allows spring 84 to expand and reduces the pressure that it can exert on spring-head 85. Spring 86 is held in compression by the adjusting plug 87 and jam nut 88. Diaphragms 71 and 72 are clamped in the center between spring-head 85, ring 89 and cap 90, and at the circumference are clamped between shell 91, ring 92 and head 93. Now diaphragm 71 is of larger area than diaphragm 72, so when cock handle 62 is in position shown in Fig. 3 and space between 71 and 72 is open to atmosphere through passage 70 and ports 69 and a, and equalizing chamber is in communication with space 74 only, a much larger pressure is required to balance springs 84 and 86 than when equalizing chamber pressure is on both sides of diaphragm 72. Valve 95 normally closes port 96 leading from space 74 to atmosphere. A movement of diaphragms 71 and 72 to the left, brings valve 95 against abutment 97 and opens space 74 to atmosphere, while a movement of diaphragms 71 and 72 to the right pushes open valve 77 and admits pressure from main reservoir to space 74.

Figures 3, 4, 5, 6, 7, 8:
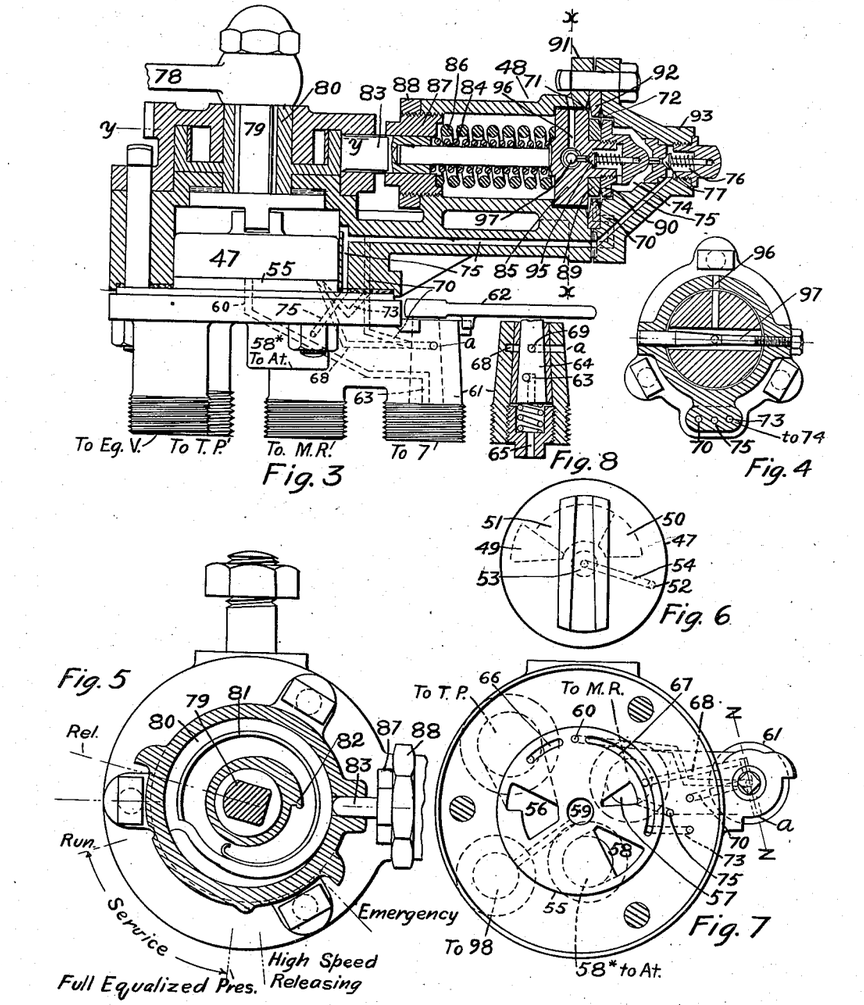
Fig. 3 is a part section and part elevation of my improved engineer's valve with train pipe regulator.
Fig. 4 is a section on line x—x of Fig. 3.
Fig. 5 is a partial section on line y—y of Fig. 3.
Fig. 6 is a plan view of the rotary valve shown in elevation in Fig. 3.
Fig. 7 is a plan of the valve seat shown in elevation in Fig. 3.
Fig. 8 is a partial section on line z—z of Fig. 7, showing the cock for changing from low to high train pipe pressure and vice versa.
Figure 13:
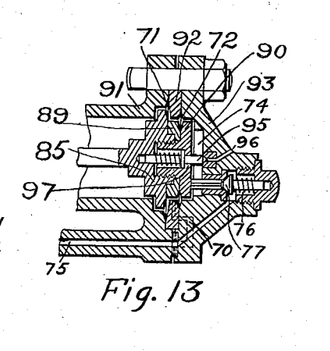
Fig. 13 is a modification of part of the mechanism shown in Fig. 3.

In the modification, Fig. 13, the action of the parts are the same as in Fig. 3, and the corresponding parts are indicated by the same reference characters.

On opposite sides of equalizing chamber 98 (Fig. 9) are pistons 99 controlling valve 100 which normally closes port 101 leading from train-pipe to the atmosphere, and 102 controlling valves 103 and 104 which normally close ports leading from main reservoir to train pipe through passage 105.

Figure 10:
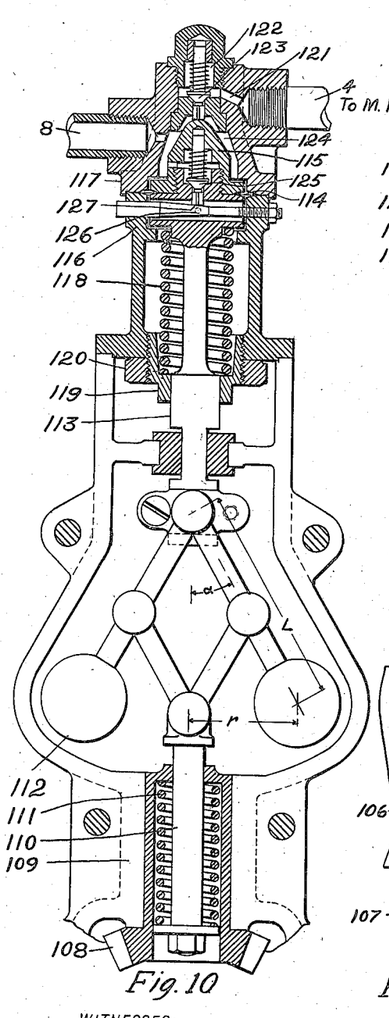
Figs. 10 and 11 are respectively sections of the upper and lower parts of my automatic high speed releasing valve.
Figure 11:
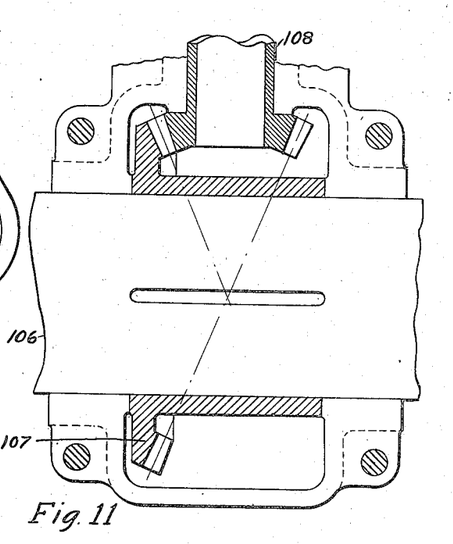

106 is an axle on the locomotive to which is fastened the gear 107 in mesh with pinion 108. Pinion 108 turns in bearing 109. Inside of pinion 108 and turning with it, is a stem 110 held down by spring 111. Fastened to stem 110 is the centrifugal ball governor 112. The upper end of 112 swivels on stem 113. The center of diaphragm 114 is clamped between stem 113 and cap 115 while circumference of 114 is clamped between shell 116 and head 117. Pressing upward on stem 113 is spring 118 held in compression by adjusting plug 119 and jam nut 120. Port 121 connects from main reservoir through pipe 4 to space 122 above valve 123. Space 124 above diaphragm 114 connects with cock 61 of engineer's valve through pipe 8. A downward movement of diaphragm 114 brings valve 125 against abutment 127 and lifts valve 125 off its seat, opening space 124 to atmosphere, while an upward movement of 114 pushes valve 123 off its seat and admits pressure from main reservoir to space 124.

Figure 12:
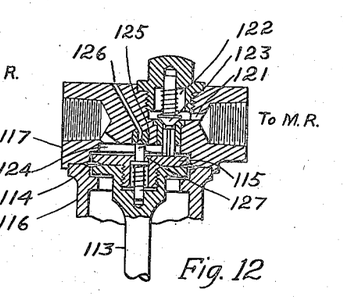
Fig. 12 is a modification of part of the mechanism shown in Fig. 10.

In the modification, Fig. 12, the action of the parts are the same as in Fig. 10 and the corresponding parts are indicated by the same reference characters.

The operation is as follows. Assuming that the cock handle 62 has been turned to a position at right angles to that shown in Fig. 3, that train-pipe, auxiliary reservoirs and supplemental reservoirs have been charged to the full running pressure for ordinary speeds and that brake handle 78 is standing at running position, to make a service application of the brakes, brake handle is moved to a service position, the degree of movement depending on the reduction of train pipe pressure desired. This movement of handle 78 has brought a part of cam 80 of smaller radius opposite spring abutment 83, allowing 83 to move to the left under pressure of spring 84 and reducing the pressure of said spring on diaphragms 71 and 72. This movement of the valve has also brought port 52 over groove 67. The pressures to the right of 71 and 72 push them forward, opening valve 95 and allowing pressure in equalizing chamber 98 to escape through pipe 9, ports 59, 53, 54 and 52, groove 67, passage 73, space 74 and port 96 to atmosphere, (pressure also escapes from space between 71 and 72 through passage 70, 69, 68, groove 67, 73, etc. to atmosphere at 96) until equilibrium is established between the forces on diaphragms 71 and 72, when valve 95 will close. Train-pipe pressure to the left hand of piston 99 will overcome the reduced pressure in equalizing chamber 98 and move piston 99 to the right, opening valve 100 and allowing pressure to escape from train-pipe 11 to atmosphere through port 101 until train-pipe pressure is reduced to a little below pressure in chamber 98, when piston 99 will move to the left-hand and close valve 100, thus preventing further reduction of train-pipe pressure. While supplemental reservoir pressure on diaphragm 19 of the triple valve will overcome the decreasing train-pipe pressure on diaphragm 17 and move the whole diaphragm system to the left, separator 29 will push open valve 33, permitting auxiliary reservoir pressure to flow through passage 26, port 34 to chamber 22, thence by passage 23 to brake cylinder 15. When brake cylinder pressure has so increased that the excess force due to brake cylinder pressure on diaphragm 18 over that on diaphragm 17, equals the difference of the force of supplemental reservoir pressure on diaphragm 19 over that of train pipe pressure on diaphragm 17, the diaphragm system will return to the right hand and allow valve 33 to close and prevent further increase of brake cylinder pressure. If it is desired to further increase the braking pressure, brake handle 78 is turned a little farther away from running position and the process before described is repeated successively at the pleasure of the operator, until brake handle has reached position of full equalized pressure, when train-pipe, brake cylinder and auxiliary reservoir pressures become equal and no further increase of brake cylinder pressure is obtainable.

For service application at high speeds, the operation is the same as for ordinary speeds, except that the handle 62 being in the position shown in Fig. 3, the fluid pressure acts only on diaphragm 72, while space between 71 and 72 is open to the atmosphere at $a$, producing a higher running train pipe pressure.

If pressure leaks from the brake cylinder, the decrease in the excess force, due to brake cylinder pressure, on diaphragm 18 over that on diaphragm 17, will enable force of supplemental reservoir pressure to overcome the combined forces of train-pipe and brake cylinder pressures and again open valve 33 to recharge brake cylinder, as previously set forth. If auxiliary reservoir in recharging brake cylinder, decreases in pressure below train-pipe pressure, auxiliary reservoir is in turn replenished from the train-pipe through check valve 25. The decrease in train pipe pressure caused by its recharging auxiliary reservoir, permits pressure in chamber 98 to overcome train-pipe pressure in space to the right of piston 102 and move piston 102 to the right to open valve 103, and possibly valve 104, if difference is great enough, admitting pressure from main reservoir to train-pipe until train-pipe pressure has again reached a value sufficient to balance pressure in chamber 98, move piston 102 and allow valve 103 or valves 103 and 104 to close.

To make a partial release of the brakes, the handle 78 is moved back toward running position a distance depending on the reduction in braking pressure desired. Cam 80 presses spring abutment 83 to the right hand, compressing spring 84, thereby increasing the force exerted by the springs on diaphragms 71 and 72, overcoming the force on diaphragms due to pressure from chamber 98 and diaphragms 71 and 72 move to the right pushing open valve 77 and admitting pressure from main reservoir to space 74 (and also, if system is running under the lower pressure, to space between 71 and 72) and chamber 98 until equilibrium is again established, when valve 77 will close, preventing further increase in pressure in chamber 98. The increased pressure in chamber 98 operates in the same manner as previously described. The increased pressure thus obtained in train-pipe, acts on diaphragm 17 along with the existing force of brake cylinder pressure on diaphragm 18 over that on diaphragm 17 to overcome supplemental reservoir pressure on diaphragm 19 and push diaphragm system to the right, separator 30 will push open valve 31 and allow brake cylinder pressure to escape to chamber 24 and thence to atmosphere through port 24*. When brake cylinder pressure has reduced until we again have a balance between the new train-pipe and brake cylinder pressures on one side and supplemental reservoir pressure on the other, valve 31 is allowed to close and prevent further escape of brake cylinder pressure.

If train-pipe pressure increases during a partial release of the brakes to a point above auxiliary reservoir pressure, auxiliary reservoir will be recharged in the manner previously described.

To make a total and quick release of the brakes, handle 78 is moved to release position, bringing port 49 in valve 47 over port 56 in valve seat and port 50 in valve 47 over port 57 in valve seat, thus establishing direct connection between main reservoir and train-pipe; pressure also flows from main reservoir to train-pipe through valves 103 and 104, the same as during a partial release. Brake handle remains in release position until train-pipe is charged to full running pressure, when handle should be turned to running position.

The operation of the triple valve when a full release is made is the same as during a partial release, except that valve 31 does not close until cylinder is completely exhausted to atmosphere.

To make an emergency application of the brakes, brake handle is moved quickly to the extreme limit of its motion, called "emergency position", thus opening train-pipe direct to atmosphere through ports 56, 50, 49 and 58, while port 52 is opposite groove 66, establishing communication between equalizing chamber 98 and train-pipe and producing a sudden application of the brakes throughout the train in the usual manner. Due to the sudden decrease in train pipe pressure, the diaphragm system, in Fig. 2, moves to the left with such force as to unseat valve 42 against spring 45, when the remaining pressure in train-pipe lifts valve 43 and flows into chamber 22 and thence to brake cylinder at the same time pressure flows slowly from auxiliary reservoir to brake cylinder through valve 33 which is held open. When brake cylinder pressure and train-pipe pressure are about equal, valve 35 is lifted by the brake cylinder pressure and the auxiliary reservoir pressure against train-pipe pressure, thus opening a large port between brake cylinder and auxiliary reservoir and almost instantly charging brake cylinder to its full pressure. When release of brakes takes place, train-pipe pressure restores valve 35 to its seat by the pressure on small piston 37. It is important that valve 35 remain closed during an emergency application of the brakes, until sufficient pressure has passed from the train-pipe to the brake cylinder to cause the next triple valve in the train to move to emergency position. If valve 35 should open prematurely, the sudden flow of pressure from auxiliary reservoir to brake cylinder, would materially check the flow of pressure from train-pipe to brake cylinder and might prevent the triple valves in the remainder of the train from going to emergency position. When the emergency application is made at the high pressure adapted for high speeds, it is necessary to reduce brake cylinder pressure as the train reduces in speed and comes to rest, or the wheels will slide on the rails. When the emergency application is made, hook on spring 81 catches on projection 82 and power is stored in the spring. As soon as the emergency application is made, the engineer releases the brake handle and spring 81 returns it to the high speed releasing position; port 52 is now over port 60 and space 98 thereby connected with space 124 of the governor, Fig. 10. Centrifugal governor 112 is rotating at a speed proportional to the speed of the train and exerts a downward pull on diaphragm 114; this pull is aided by the pressure of the fluid remaining in equalizing chamber 98, because chamber 98 and space 124 are connected by pipe 8, ports 65, 63, 60, 52, 53 and 59, and pipe 9, and opposed by spring 118. As train reduces in speed, the pull of governor 112 on diaphragm 114 decreases. When spring 118 overcomes the opposing forces and moves diaphragm 114 upward, it will unseat valve 123 and admit pressure from main reservoir to space 124 and chamber 98, thus effecting an increase in train-pipe pressure and a graduated release of brake cylinder pressure in the manner previously described. This operation goes on continuously until train comes to rest.

In case a particle of foreign matter becomes lodged between valve 123 and its seat, preventing the valve from closing or partially closing when spring 118 is overcome by governor 112 and increased pressure in 124 in order to check a too rapid flow of pressure into chamber 98, pressure in space 124 with the help of governor 112 will overcome spring 118 to a sufficient extent to lift valve 125 from its seat and relieve pressure in space 124 to the required extent.

The value of the coefficient of friction between a cast-iron brake shoe and a steel-tired car wheel is expressed approximately by the formula $$f = \frac{.32}{1 + .035S}$$

in which $f$ equals coefficient of friction and $S$ equals speed of train in miles per hour. The coefficient of friction between car wheels and track rails is practically a constant, so long as there is no sliding between them. Let $r$ equal radius of gyration of governor 112; let $v$ equal velocity of the center of gyration of governor 112; then centrifugal force exerted by governor 112 is proportional to $\frac{v^2}{r}$ and since $v$ is proportional to $r \times s$, centrifugal force is proportional to $$\frac{r^2 \times s^2}{r} = s^2 r.$$

Let $\alpha$ equal the angle between axis of rotation of governor 112 and a line drawn through center of gyration and the upper hinged joint of governor. Then the downward pull of the governor is proportional to $s^2 r \, ctn\alpha$. Let L equal the distance from center of gyration to upper hinged joint of governor, then $$ctn\alpha = \frac{\sqrt{L^2 - r^2}}{r}$$

so downward pull of governor is proportional to $$s^2 r \times \frac{\sqrt{L^2 - r^2}}{r} = s^2 \sqrt{L^2 - r^2}.$$

By the use of spring 111, radius of gyration $r$ increases, while speed $s$ of train increases and R decreases while $s$ decreases. Since L is a practically constant quantity, the decrease in $r$ as $s$ decreases checks a too rapid change in the value of the pull of governor 112. By properly proportioning spring 111 and governor 112, we can very nearly approach the ideal variation of train-pipe pressure so as to secure a brake cylinder pressure inversely proportional to the coefficient of friction $f$ between brake shoes and wheels, and the maximum retarding effect without the risk of sliding the wheels.

If it is desired to retard the action of valve 35, a suitable spring may be placed to the left of piston 37 to hold valve 35 against its seat. A valve or cock may be provided in order to reduce the pressure in reservoir 16 when changing from high speed braking to ordinary braking.

Supplemental reservoir 16 is kept continually charged to a pressure equal to full running train-pipe pressure by means of a passage in the cutaway portion of Fig. 2, and a check valve located in said passage, similar to check valve 25 in passage 26, said passage in the cutaway portion opening at one end to space 20 and at the other end to supplemental reservoir 16, said check valve in said cutaway portion permitting pressure to flow from space 20 to supplemental reservoir but preventing flow in the reverse direction.

If brake handle is placed in running position before train-pipe pressure has increased to full running pressure, or if pressure leaks from train-pipe due to any cause, train-pipe pressure will be restored by the feed valve in the same manner as described when pressure leaked from brake cylinder.

It will be readily seen that I may use flexible diaphragms in place of the pistons shown in Fig. 9 to operate the feed valves and the discharge valve without departing from the invention.

Having described my invention, I claim:—

1. In a fluid pressure brake system, the combination of a train-pipe, a brake cylinder, an auxiliary reservoir and a valve controlling a large port between the brake cylinder and auxiliary reservoir, said valve being subjected on one side to combined brake cylinder and auxiliary reservoir pressures and on the other side to train-pipe pressure.

2. In a fluid pressure brake system containing a train-pipe, a brake cylinder and an auxiliary reservoir, and a valve subjected on opposite sides to brake cylinder and train pipe pressure and having a large intermediate port whereby when train-pipe pressure and brake cylinder pressure have become practically equal, a large port is opened between auxiliary reservoir and brake cylinder.

3. In a fluid pressure brake system containing a train-pipe, an auxiliary reservoir, a brake cylinder, a triple valve, and means for admitting train-pipe pressure to brake cylinder in emergency applications of the brakes, and a valve subjected on opposite sides to brake cylinder and train pipe pressure and having a large intermediate port.

4. In a fluid pressure brake system containing a train-pipe, an auxiliary reservoir, a brake cylinder, a triple valve and means for admitting train-pipe pressure to the brake cylinder in emergency applications of the brakes, and a valve subjected on opposite sides to brake cylinder and train pipe pressure and having a large intermediate port.

5. In a fluid pressure brake system containing a brake cylinder, an auxiliary reservoir, a train-pipe, a triple valve designed to secure a graduated release of brake cylinder pressure when train-pipe pressure is increased to a corresponding degree, and automatic means controlled by the speed of the train for gradually increasing train-pipe pressure as the speed of the train decreases.

6. In a fluid pressure brake system, the combination of a brake cylinder, a triple valve, a train-pipe and means controlled by the speed of the train for gradually increasing the pressure in the train-pipe as the speed of the train decreases.

7. In a fluid pressure brake system, an engineer's valve provided with means for returning its handle to partial release position after it has been manually moved to emergency position, in combination with means for gradually automatically increasing train-pipe pressure as the speed of the train decreases.

8. In a fluid pressure brake system, an engineer's valve provided with means for returning its handle to partial release position after it has been manually moved to emergency position, in combination with means for gradually automatically increasing train-pipe pressure as the speed of the train decreases, a brake cylinder and a triple valve adapted to reduce brake cylinder pressure as train-pipe pressure increases.

9. In a fluid pressure brake system, the combination of a brake cylinder, an auxiliary reservoir, a train-pipe, a triple valve adapted to reduce brake cylinder pressure as train-pipe pressure is fractionally increased, means operative automatically when an emergency application of the brakes is made and actuated by a part of the train whose motion relative to that of the train itself, depends upon the speed of the train, for gradually increasing the pressure in the train-pipe as the speed of the train decreases.

10. In a fluid pressure brake system, the combination of a brake cylinder, an auxiliary reservoir, a train-pipe, a triple valve adapted to reduce brake cylinder pressure as train-pipe pressure is fractionally increased, a main reservoir, a valve controlling a port from the main reservoir to the train-pipe and centrifugal mechanism actuated in accordance with the speed of the train to open said valve as the speed decreases.

11. In a fluid pressure brake system, the combination of a brake cylinder, an auxiliary reservoir, a train-pipe, a triple valve adapted to reduce brake cylinder pressure as train-pipe pressure is fractionally increased, a main reservoir, a valve controlling a port from the main reservoir to the train-pipe, a shaft rotating in proportion to the rotation of the axles of the train and mechanism actuated by said shaft to open said valve for successive intermittent intervals as the speed of the train decreases.

12. In a fluid pressure brake system, means whereby gradual increases of pressure in the train-pipe will effect corresponding decreases of pressure in the brake cylinder, in combination with a train-pipe, an engineer's valve and means for automatically charging the train-pipe after emergency applications to a gradually increasing pressure varying in proportion to the decrease of speed of the train.

13. In a fluid pressure brake system, the combination of a train-pipe and an engineer's valve, the latter comprising a valve acted upon in one direction by spring tension and in the other by fluid pressure, said valve controlling the escape of said fluid pressure, a train-pipe feeding and discharge valve also controlled by the same fluid pressure, and means whereby the said spring tension can be altered by a movement of the handle of the engineer's valve.

14. In a fluid pressure brake system having an auxiliary reservoir, a train-pipe, a brake cylinder and a triple valve in which train-pipe pressure and brake cylinder pressure coöperate in opposing a practically constant force, means whereby a reduction in train-pipe pressure will cause a valve to be opened and held open to admit pressure to brake cylinder from auxiliary reservoir until brake cylinder pressure has increased sufficiently to compensate for the decrease in train-pipe pressure in opposing said practically constant force.

15. In a fluid pressure brake system having an auxiliary reservoir, a train-pipe, a brake cylinder and a triple valve in which train-pipe pressure and brake cylinder pressure coöperate in opposing a practically constant force, means whereby an increase in train-pipe pressure will cause a valve to be opened and held open between brake cylinder and atmosphere until the resulting decrease in brake cylinder pressure has offset the increase in train-pipe pressure in opposing said practically constant force.

16. In a fluid pressure brake system having a brake cylinder, an auxiliary reservoir, a train-pipe, and a triple valve in which train-pipe pressure and brake cylinder pressures coöperate in opposing a practically constant force, means whereby a leakage from, or decrease in brake cylinder pressure while train-pipe pressure remains unchanged, will cause a valve to be opened and held open to admit pressure to brake cylinder from auxiliary reservoir, until brake cylinder pressure has increased to the pressure obtaining before leakage occurred.

17. In a fluid pressure brake system containing a brake cylinder, an auxiliary reservoir, a triple valve and an engineer's valve provided with an equalizing discharge valve and an equalizing feed valve, means controlled by the brake handle for varying the pressure in the equalizing chamber of said equalizing discharge valve and said equalizing feed valve and automatic means for maintaining any pressure in said equalizing chamber determined by a movement of the brake handle.

18. In a fluid pressure brake system, the combination of a brake cylinder, an auxiliary reservoir, a train-pipe, and a triple valve in which brake cylinder pressure coöperates with train-pipe pressure in opposition to a practically constant force, means whereby an excess of combined train-pipe and brake cylinder pressures over said constant force will move the parts of the triple valve to release position, an excess of said constant force over combined train-pipe and brake cylinder pressures will move the parts of the triple valve to service position and an equality between combined train-pipe and brake cylinder pressures, and the said constant force will move the parts of the triple valve to lap-position, an engineer's valve adapted to increase and decrease train-pipe pressure and means for maintaining any pressure in the train-pipe once determined by a movement of the brake handle.

In witness whereof, I subscribe my signature, in presence of two witnesses.

WALTER MERVILLE AUSTIN.

Witnesses:
HERBERT A. BENNER,
GEO. W. FIELDHOUSE.